United States Patent Office 3,701,776
Patented Oct. 31, 1972

3,701,776
SULFONES DERIVED FROM TRICHLOROTHIOPHENE
Daniel Pillon and Van Quy Trinh, Lyon, France, assignors to PEPRO, Société pour le Developpement et la Vente de Specialites Chimiques, Lyon, France
No Drawing. Filed Dec. 6, 1968, Ser. No. 781,968
Claims priority, application France, Dec. 8, 1967, 49,418
Int. Cl. C07d 87/46, 29/34, 63/14
U.S. Cl. 260—247.1          1 Claim

ABSTRACT OF THE DISCLOSURE

Sulfones derived from trichlorothiophene having the general formula

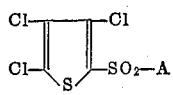

and the utilization thereof as a parasiticide, insecticide, fungicide, nematicide and herbicide.

---

The present invention relates to new chemical compounds derived from tetrachlorothiophene, to a method for producing said compounds, and to the use thereof as agricultural parasiticides, in particular as insecticides, fungicides, and herbicides.

The compounds according to the invention have the empirical formula

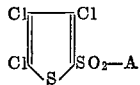     (1)

with A=O—Ar or

wherein Ar is an aryl radical (in particular, phenyl, naphthyl), which may be substituted by one or more identical or different radicals selected from the following radicals: halogen, NO$_2$, alkyl, cycloalkyl; and R' and R" are two identical or different radicals selected from the following groups: hydrogen, linear or branched alkyl radicals, containing from 1 to 6 carbon atoms, which may be substituted by halogen atoms, or cyano radicals; alkoxyalkyl radicals; aryl radicals (in particular, phenyl or naphthyl), which may be substituted by one or more identical or different radicals, selected from the following radicals: alkyl, halogenated alkyl (in particular, CF$_3$, CCl$_3$), alkoxy, NO$_2$, CN, and halogens; heterocyclic radicals, which may be substituted and attached to the nitrogen atom, either by a direct bond, or through an alkylene chain. Moreover, the two radicals R', R", may form with the nitrogen atom a saturated, or unsaturated, heterocycle containing one or more other heteroatoms, such as O, N, S. This heterocycle may in turn be substituted by one or more of the above-mentioned groups.

The compounds of the invention are prepared in three stages, from tetrachlorothiophene.

Trichloro-2,3,4-thiophene is prepared by treating tetrachlorothiophene with magnesium, in the presence of traces of alkyl halide, and by hydrolyzing the organo-magnesium compound thus obtained.

The trichloro-3,4,5-thiophene-sulfonyl-2 chloride is then prepared by acting on the trichloro-2,3,4-thiophene with chlorosulfonic acid.

Lastly, phenols (or amines), eventually substituted, are condensed on the sulfonyl chloride previously obtained.

Using tetrachlorothiophene as raw material is very advantageous from an economical standpoint. As a matter of fact, this compound is readily obtained by allowing sulfur to react with hexachlorobutadiene, the latter being in turn a by-product of the manufacture of carbon tetrachloride, and being therefore readily available at very low prices.

Trichloro-2,3,4-thiophene is obtained by the method described by Steinkopf, Jacob and Penz in "Annalen der Chemie," 1934, pages 150 and upwards. The only difference lies in the fact that we used anhydrous deperoxidized tetrahydrofuran as a solvent, whereas Steinkopf et al. used ether. As a matter of fact, we found that the yield was much better (65–70%).

Trichloro-3,4,5-thiophene-sulfonyl-2 chloride is obtained through the action of chlorosulfonic acid, according to the conventional method, as shown by the following example:

EXAMPLE 1

Trichloro-3,4,5-thiophene-sulfonyl-2 chloride 41.25 g. (0.22 mole) of trichloro-2,3,4-thiophene are mixed dropwise with 73.3 g. (0.629 mole) of chlorosulfonic acid cooled to —15° C. Hydrochloric acid is released, and the mass becomes pasty and brown, while the mixture is allowed to reach again the room temperature. The mixture is then heated to 40° C. for one hour. The pasty mass obtained is then thrown onto 300 g. of cracked ice, with vigorous stirring. A precipitate forms, and is drained, washed and dried. The sulfonyl chloride recrystallizes in a mixture of sulfuric ether and petroleum ether. It has a melting point of 54° C., and the yield is 57.5%.

The aryl sulfonates of the present invention are obtained by allowing the eventually substituted phenols to react with the trichloro-3,4,5-thiophene-sulfonyl-2 chloride, in the presence of an acid acceptor such as triethylamine, pyridine, and the like.

EXAMPLE 2

Preparation of (chloro-4-dimethyl-3,5)phenyl trichloro-3,4,5-thiophene-sulfonate-2

A solution of 0.025 mole of trichloro-3,4,5-thiophenesulfonyl-2 chloride dissolved in 30 cc. of anhydrous toluene, is added to a mixture of 0.25 mole of chloro-4-dimethyl-3,5-phenol and 0.025 mole of triethylamine, dissolved in 70 cc. of anhydrous toluene. The whole mixture is then brought to a boil for two hours, after which it is washed with water, and dried over anhydrous magnesium sulfate. After the toluene is evaporated, the residue is recrystallized in petroleum ether. Melting point, 80° C. Yield, 80.8%.

The following compounds are prepared by the above method:

| Nos. | Ar | Yield, percent | Physical character, M.P. (° C.) |
|---|---|---|---|
| 3 |  | 23 | ¹ 94–100 |
| 4 |  | 67 | 63–66 |
| 5 | 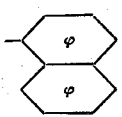 | 40.8 | 131–133 |
| 6 |  | 71.6 | 106 |

| Nos. | Ar | Yield, percent | Physical character, M.P. (° C.) |
|---|---|---|---|
| 7 | ![C(CH3)3, NO2, NO2 substituted phenyl] | 13.8 | 117 |
| 8 | ![biphenyl with H] | 36.5 | 68 |

¹ B.P. (under 23 mm. Hg).

Trichloro-3,4,5-thiophene-2 sulfonamides

Sulfonamides having the empirical formula

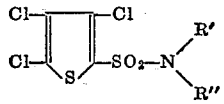

are prepared by condensing trichloro-3,4,5-thiophene-sulfonyl-2 chloride on various amines, in the presence of an acid acceptor.

EXAMPLE 9

Trichloro-3,4,5-thiophene-sulfonanilide-2

A solution of 0.025 mole of trichloro-3,4,5-thiophene-sulfonyl-2 dissolved in 60 cc. of anhydrous toluene is poured on a mixture of 0.025 mole of aniline and 0.025 mole of triethylamine, dissolved in 80 cc. of anhydrous toluene. The whole mixture is then brought to boil for two hours, after which it is washed with distilled water, and then dried over anhydrous magnesium sulfate.

After the solvent is evaporated, the solid residue is recrystallized in a mixture of sulfuric ether and petroleum ether. M.P. 157.° C. Yield, 25.8%.

EXAMPLE 10

By a process similar to that described in Example 9, we prepare the following compounds:

| Nos. | R' | R'' | Physical character, M.P. (° C.) | Yield, percent |
|---|---|---|---|---|
| 10 | | —N⟨phenyl⟩ | 143 | 83 |
| 11 | | —N⟨morpholine⟩ | 158 | 85 |
| 12 | H | methylisoxazole | 106 | 37.5 |
| 13 | $CH_3$ | $(CH_2)_2OCH_3$ | 30–35 | 55.8 |
| 14 | H | ⟨C₆H₁₁⟩ | 110 | 31.6 |
| 15 | $CH_3$ | $(CH_2)_2OCH_3$ | 52 | 72 |
| 16 | $CH_3$ | n-$C_3H_7$ | 74 | 80.6 |
| 17 | $CH_2$—$CH_3$ | n-$C_4H_9$ | 52 | 52.3 |
| 18 | $CH_3$ | iso-$C_3H_7$ | 77 | 75.3 |
| 19 | $CH_3$ | iso-$C_3H_7$ | 77 | 50.6 |

The compounds of the invention show outstanding pesticidal properties, which are very varied. As a matter of fact, depending in particular on the nature of the radicals R' and R'' selected, we obtain:

Either insecticides, adapted to be used for fighting against the conveyors of human or animal diseases, against the enemies of plants and crops, and for protecting materials or products stored or worked up; or Fungicides, adapted to be used for fighting against the enemies of plants and crops, and for protecting materials stored or worked up; or else Herbicides, the activity of which is either selective, which enables them to be used for destroying the whole of the adventitious weeds likely to interfere with the growth of a crop, or total, which enables them to be used when it is desired to remove any plant life from a given location.

Some of said compounds have their maximum activity in treatments effected before sowing or planting the plants, others in pre-coming up treatments (effected after sowing the plants, but before the latter, or the ill-weeds, come up), and others in treatments effected when the plants and/or the ill-weeds have come up.

The following examples bring out some of the aspects of the pesticidal activity of the compounds of the invention. Said examples are given only by way of illustration, and the applications they describe do not limit the scope of the invention. Obviously, the present invention embraces all the parasiticide uses of the compounds having the Formula 1, whatever may be the ways and doses used.

TESTS FOR INSECTICIDAL ACTIVITY

EXAMPLE 13

Activity against "Aedes aegypti"

Larvae of *Aedes aegypti* are put in an aqueous 20 mg./l. solution of active material, and after 2 days, the number of dead and alive larvae are counted.

Under such conditions, products Nos. 2, 3, 4, 7, 10, 11, 13, 14, 15, 16, 17, 18 and 19 give a 100% death rate among the larvae.

EXAMPLE 14

Activity against "Ephestia kuhnielle"

Small cups made of azyme were soaked with 3 drops of an acetone solution containing 2 g./l. of the active material. After evaporation of the solvent, 10 eggs of *Ephestia kuhnielle* were disposed at the bottom of each cup, which was then closed by means of a glass plate. After 7 days, the dead and alive larvae were counted. Under such conditions, products Nos. 2, 4, 11, 13, 14, 15, 16, 17, 18 and 19 had caused the death (or prevented the hatching) of 100% of the larvae (or of the eggs). Under the same conditions, but at a dose of 0.05 g./l., product No. 7 still causes the death of all the larvae.

EXAMPLE 15

Anti-acarid activity

Discs were cut from bean plant leaves infested with *Tetranychus urticae*. A 1 g./l. solution of active material was then sprayed over said discs. After 48 hours, the number of dead and alive acarids were counted. Under such conditions, products Nos. 7, 16, 17 and 19 caused the death of 100% of the acarids.

TEST FOR NEMATICIDAL ACIVITY

EXAMPLE 16

10 cc. of a solution of the product to be tested were poured into a 250 cc. screw-cap powder flask, and then 3–4 drops of a concentrated solution of 4-day old nematodes (*Coenorhabditis elegens*) were added thereto. After 48 hours, the result was observed by means of a binocular magnifying lens, to obtain the death rate. Under such conditions, product No. 3 destroys 100% of the nematodes, at a dose of 0.5 g./l.

TEST FOR FUNGICIDAL ACTIVITY

EXAMPLE 17

Activity against corn-mildew

The plants were treated with a wash prepared from a wettable powder containing 20% of the product to be tested, and diluted so as to contain 2 g./l. of active material. The plants were then infected with spores of the fungus selected, and the growth of said fungus was observed. Under such conditions, products Nos. 7 and 13 prevented totally the growth of *Erysiphe graminis*, which is the cause of corn-mildew.

Under the same conditions, but with a dose twice as small, product No. 13 still prevents *Erysiphe graminis* from growing.

TEST FOR WEED-KILLING ACTIVITY

EXAMPLE 18

When used at a dose of 10 kg./ha., after the plants have come up, product No. 7 destroys the turnips completely, while showing a very good selectivity as regards certain graminaceae.

The compounds of the invention should, for the practical use thereof, be formulated according to the techniques conventionally used in the pesticide industry.

Thus, they may be used as powders to be sprinkled, wettable powders, solutions, direct or reversed emulsions of water in oil, or oil in water, and the like.

Such various types of formulations require then the addition of inert carriers, such as clays, talc, or the like, of solvents, such as water or organic solvents, as well as of various adjuvants adapted to further the use and improve the physical properties of the compositions produced. Such adjuvants, depending on the particular composition, may be emulsifying agents, and/or anticaking agents, and/or wetting agents, and/or sticking agents.

It will be understood that changes may be made in the details of formulation and operation without departing from the spirit of the invention, especially as defined in the following claim.

We claim:
1. A compound of the formula

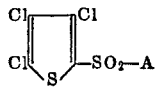

wherein A is selected from the group consisting of

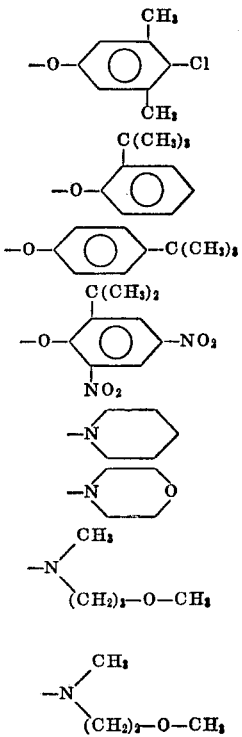

and

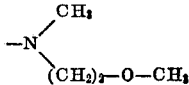

References Cited

UNITED STATES PATENTS 2,949,482  8/1960  Sims et al. _____ 260—456

OTHER REFERENCES

Rhodehamel et al.: J. Am. Pharm. Assn., 31:281–3 (1942).
Profft: C. A. 55.: 1573–4 (1–61).
Stota: C.A. 57: 13659 (11–62).

HENRY R. JILES, Primary Examiner

C. M. SHURKO, Assistant Examiner

U.S. Cl. X.R.

260—293.68, 332.3 R, 332.5; 71—91; 424—248, 267, 275